(12) United States Patent
Sirola et al.

(10) Patent No.: US 6,784,834 B2
(45) Date of Patent: Aug. 31, 2004

(54) METHOD FOR PERFORMING POSITIONING AND AN ELECTRONIC DEVICE

(75) Inventors: Niilo Sirola, Tampere (FI); Jari Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/246,344

(22) Filed: Sep. 17, 2002

(65) Prior Publication Data

US 2003/0058162 A1 Mar. 27, 2003

(30) Foreign Application Priority Data

Sep. 17, 2001 (FI) .............................................. 20011828

(51) Int. Cl.$^7$ .............................................. G01S 5/14
(52) U.S. Cl. .............................. 342/357.15; 342/357.06
(58) Field of Search ...................... 342/357.15, 357.09, 342/357.04, 357.06

(56) References Cited

U.S. PATENT DOCUMENTS

| 5,491,645 | A | 2/1996 | Kennedy et al. ............... 342/95 |
| 5,548,293 | A | 8/1996 | Cohen ........................ 342/352 |
| 6,181,274 | B1 * | 1/2001 | Pratt et al. ............. 342/357.04 |
| 6,466,164 | B1 * | 10/2002 | Akopian et al. ....... 342/357.15 |

FOREIGN PATENT DOCUMENTS

| EP | 1014103 | 6/2000 |
| WO | 0058748 | 10/2000 |

OTHER PUBLICATIONS

Niilo Sirola, "*A Method for GPS Positioning Without Current Navigation Data*," M.S. Thesis, XP–002224641, Sep. 20, 2001.

* cited by examiner

Primary Examiner—Gregory C. Issing
(74) Attorney, Agent, or Firm—Ware, Fressola, Van Der Sluys & Adolphson LLP

(57) ABSTRACT

The invention relates to a method for performing positioning, in which a spread spectrum signal modulated with a repetition code and transmitted by satellites, is received. The method comprises the steps of performing acquisition to the received, spread spectrum modulated signal, measuring the code phase of the received, spread spectrum modulated signal, and receiving the ephemeris parameters of satellites which are used in the positioning. In the method an optimizing phase is performed in order to minimize a cost function. The cost function includes a fraction operator having an argument that includes at least one residual error.

21 Claims, 2 Drawing Sheets

METHOD FOR PERFORMING POSITIONING AND AN ELECTRONIC DEVICE

CROSS REFERENCE TO RELATED APPLICATIONS

This application claims priority under 35 USC §119 to Finnish Patent Application No. 20011828 filed on Sep. 17, 2001.

FIELD OF THE INVENTION

The present invention relates to a method for performing positioning, comprising the steps of receiving a signal transmitted by satellites that is spread spectrum modulated with a repetition code, performing acquisition to the received spread spectrum modulated signal, measuring the code phase of the received spread spectrum modulated signal, receiving satellite ephemeris parameters which are used in the positioning, determining a cost function, and performing an optimizing phase for minimizing the cost function. The invention relates also to an electronic device comprising means for performing positioning, comprising means for receiving a signal transmitted by satellites that is spread spectrum modulated with a repetition code, means for acquisition to the received spread spectrum modulated signal, means for measuring the code phase of the received spread spectrum modulated signal, means for receiving satellite ephemeris parameters to be used in the positioning, means for determining the cost function, and means for minimizing the cost function.

BACKGROUND OF THE INVENTION

In positioning systems based on satellite positioning, a positioning receiver attempts to receive signals of at least four satellites in order to detect the position and the time data of the positioning receiver. An example of such a satellite positioning system is the GPS system (Global Positioning System), comprising a plurality of satellites orbiting the globe according to predefined orbits. These satellites transmit orbit data, on the basis of which the position of a satellite can be determined at each moment of time, in case the exact time data used in the satellite positioning system is known in the positioning receiver. In the GPS system, the satellites transmit a spread spectrum signal modulated with a code that is individual for each satellite. Thus, the positioning receiver can distinguish signals transmitted by different satellites from each other by using a reference code corresponding to a satellite code generated locally in the positioning receiver.

Each operating satellite of the GPS system transmits a so-called L1 signal at the carrier frequency of 1575.42 MHz. This frequency is also indicated with $154f_0$, where $f_0=10.23$ MHz. Furthermore, the satellites transmit another ranging signal at a carrier frequency of 1227.6 MHz called L2, i.e. $120f_0$. In the satellite, these signals are modulated with at least one pseudo sequence. This pseudo sequence is different for each satellite. As a result of the modulation, a code-modulated wide-band signal is generated. The modulation technique used in the receiver makes it possible to distinguish between the signals transmitted by different satellites, although the carrier frequencies used in the transmission are substantially the same. This modulation technique is called code division multiple access (CDMA). In each satellite, the pseudo sequence used for modulating the L1 signal is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with the polynomial $X^{10}+X^3+1$, and the second binary sequence G2 is formed by delaying the polynomial $X^{10}+X^9+X^8+X^6+X^3+X^2+1$ in such a way that the delay is different for each satellite. This arrangement makes it possible to generate different C/A codes by using identical code generators. The C/A codes are thus binary codes whose chipping rate in the GPS system is 1.023 MHz. The C/A code comprises 1023 chips, wherein the iteration time (epoch) of the code is 1 ms. The carrier of the L1 signal is further modulated by navigation information at a bit rate of 50 bit/s. The navigation information comprises information about the "health", orbit, time data of the satellite, etc.

In order to detect satellite signals and identify satellites the receiver must perform acquisition, whereby the receiver searches for the signal of each satellite at the time and attempts to perform acquisition and to be locked to this signal so that the information transmitted with the signal can be received and demodulated.

The positioning arrangement has two primary functions:

1. to calculate the pseudo range between the receiver and different GPS satellites, and
2. to determine the position of the receiver by utilizing the calculated pseudo ranges and the position data of the satellites. The position data of the satellites at each time can be calculated on the basis of the ephemeris and time correction data received from the satellites.

The distances to the satellites are called pseudo ranges, because the time is not accurately known in the receiver. Thus, the determinations of position and time are iterated until a sufficient accuracy is achieved with respect to time and position. Because the time is not known with absolute precision, the position and the time must be determined e.g. by linearizing a set of equations for each new iteration.

The calculation of pseudo range can be performed, for example, by measuring the code phases of the satellite signals in the receiver.

The above-mentioned acquisition and frequency control process must be performed for each satellite signal received in the receiver. Some receivers may comprise multiple receiving channels, wherein an attempt is made in each receiving channel to perform acquisition to a signal of one satellite at a time.

The positioning receiver receives information transmitted by satellites and performs positioning on the basis of the received information. In order to perform positioning the receiver must receive a signal transmitted by at least four different satellites to detect the x, y, z coordinates and the time data. The received navigation information is stored in a memory, wherein this stored information can be used for detecting e.g. the ephemeris data of satellites.

FIG. 1 shows, in a principle chart, positioning in a wireless communication device MS comprising a positioning receiver by means of a signal transmitted from four satellites SV1, SV2, SV3, SV4. In the GPS system, the satellites transmit ephemeris data as well as time data, on the basis of which the positioning receiver can perform calculations to determine the position of the satellite at a time. These ephemeris data and time data are transmitted in frames (not shown in the appended figures) which are further divided into subframes. In the GPS system, each frame comprises 1500 bits which are divided into five subframes of 300 bits each. Since the transmission of one bit takes 20 ms, the transmission of each subframe will thus take 6 s, and the whole frame will be transmitted in 30 seconds. The subframes are numbered from 1 to 5. In each subframe 1, e.g. time data is transmitted, indicating the moment of transmission of the subframe as well as information on the deviation of the satellite clock with respect to the time in the GPS system.

The subframes 2 and 3 are used for transmission of ephemeris data. The subframe 4 contains other system information, such as universal time, coordinated (UTC). The subframe 5 is intended for the transmission of almanac data of all the satellites. The entity of these subframes and frames is called a GPS navigation message, which comprises 25 frames, i.e. 125 subframes. The length of the navigation message is thus 12 min 30 s.

In the GPS system, time is measured in seconds from the beginning of a week. In the GPS system, a week begins at midnight between Saturday and Sunday. Each subframe to be transmitted contains information on the moment of the GPS week when the subframe in question has been transmitted. Thus, the time data indicates the time of transmission of a certain bit, in the GPS system this is the transmission time of the last bit in the subframe in question. In the satellites, time is measured with high-precision atomic chronometers. In spite of this, the operation of each satellite is controlled in a control centre for the GPS system (not shown), and e.g. time comparison is performed to detect chronometric errors in the satellites and to transmit this information to the satellite.

SUMMARY OF THE INVENTION

It is an aim of the present invention to provide a new method for carrying out positioning. The invention is based on the idea that a new cost function is formed, and the minimum of this cost function is searched for. To be more exact, the method according to the present invention is mainly characterized in that the cost function includes a fraction operator having an argument that includes at least one residual error.

The electronic device according to the present invention is mainly characterized in that the cost function includes a fraction operator having an argument that includes at least one residual error.

Considerable advantages are achieved by the present invention when compared with positioning systems and receivers of prior art. Upon applying the method according to the invention there is no need to indicate the navigation data sent together with the satellites. Thus, positioning can be performed also from a noisier signal, which improves the usability of positioning even in weak signal conditions, such as indoors. Because it is not necessary to receive the frames used in the transmission of navigation data before positioning, applying the method of the invention enables faster positioning and shorter detection time for Time To First Fix (TTFF) compared to prior art receivers. Furthermore, in the method according to a preferred embodiment of the invention it is not necessary to guess the position and the reference time of the receiver in advance, instead this information can be found out during a calculation carried out in the positioning. Moreover, in this embodiment the error of the reference time of the receiver can be as much as over 420 s, which in prior art receivers would mean that the correct positioning of the receiver could not be carried out.

DESCRIPTION OF THE DRAWINGS

In the following, the present invention will be described in more detail with reference to the appended drawings, in which.

DETAILED DESCRIPTION OF THE INVENTION

Figure 2:
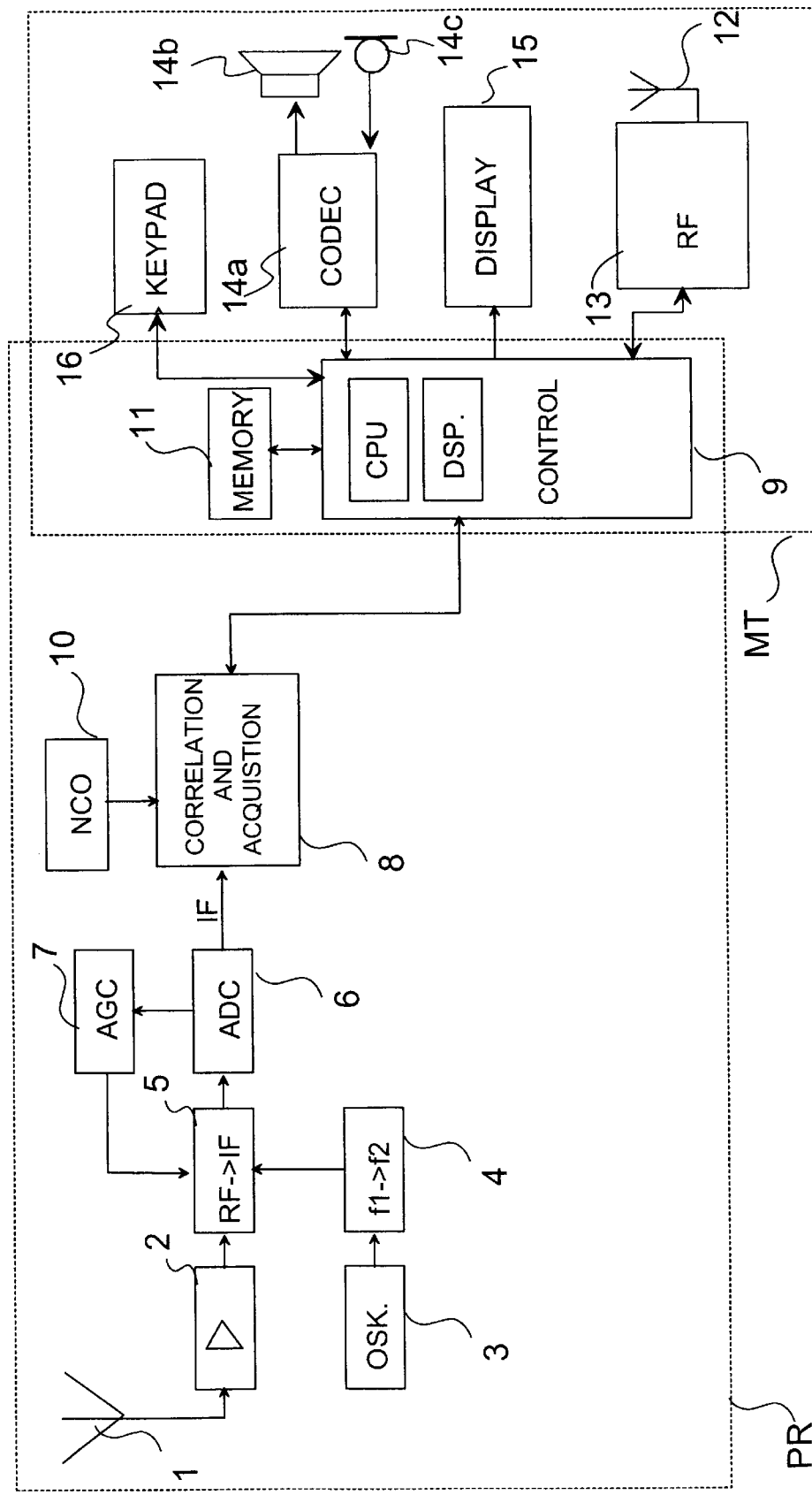
FIG. 2 shows an electronic device according to a preferred embodiment of the invention in a reduced block chart.

In the following, the invention will be described with reference made to an electronic device illustrated in FIG. 2. The electronic device MS comprises preferably mobile communication means MT and a positioning receiver PR. In this case, the mobile communication means MT can be used for transmitting information between the mobile communication device MS and base stations BS, BS', BS" of a wireless communication network MN. Nevertheless, it is obvious that the invention can be applied in connection with other electronic devices comprising at least a positioning receiver PR.

In the positioning receiver PR, the signal received via an antenna 1 and spread spectrum modulated with a repetition code is amplified in a high-frequency amplifier 2 and modified, by means of a clock signal generated by a clock generator 3 and a frequency synthesizer 4, preferably to an intermediate frequency or directly to baseband in a modifying block 5. At this stage, the signal is preferably still in analog format, wherein it is converted to a digital signal in an analog-to-digital converter 6. The analog-to-digital converter 6 provides not only a digital-reception signal but also a control to an automatic gain control (AGC) block 7 to level out variations in strength of the received signal in a way known as such. The digital signal converted to an intermediate frequency or to the baseband is led to one or more digital monitoring blocks 8 to perform conversion of the digital signal to two signals with different phases (I/Q) and multiplication with a reference code. The monitoring block 8 comprises a plurality of receiving channels, wherein e.g. said multiplication with a reference code can be carried out simultaneously to a signal received from multiple different satellites. The signals formed in the monitoring block 8 are further led to a control block 9, preferably to a digital signal processor DSP, to find out for each channel separately the code phase and frequency shift of the received signal. The control block 9 forms feedback to the monitoring block 8, to adjust the code phase of the reference code and a numerically controlled oscillator 10, it necessary. After the code phase and the frequency shift have been determined, that is, the receiver has tracked the signal to be received, it is possible to start the signal pseudo distance measurements and, if necessary, demodulation and storage of the navigation information transmitted in the signal, if possible. The control block 9 preferably stores navigation information in a memory 11. The receiver PR may also receive navigation information, for example, with the mobile communication means MT from a mobile switching centre MSC via the base station BS of the mobile communication network.

In a method according to a preferred embodiment of the invention, it is measured from signals received from satellites the number $T_{chip}^{k}$ of chips received and a code phase $T_{\Delta chip}^{k}$ after a change of code phase in the control block 9. At the point when the positioning receiver PR has access to at least that part of navigation information that relates to ephemeris data of those satellites that have transmitted the signals which are being received, the positioning can be started. In connection with the present invention, preferably the cost function according to the following formula (2) is used in the positioning, wherein an attempt is made to find the minimum of said cost function.

$$f(t, x, \beta) = c \sum \left[ frac\left( \phi_i + \varepsilon_i(t, x) + \beta - \frac{1000}{c} \|s_i(t - \tau_i) - x\| \right) \right]^2, \quad (2)$$

in which $$\tau_i = \frac{1}{c} \|s_i(t - \tau_i) - x\|,$$

the estimated propagation time of the signal from a satellite $SV_i$ to the positioning receiver, t time
x the position of the positioning receiver,
β the clock error of the positioning receiver in milliseconds,
$\phi_i$ the code phase of the signal of the satellite $SV_i$ in the positioning receiver,
$\varepsilon_i$ estimated compensation of a measuring error (pseudo range correction) comprising group delay, time correction of satellites, and ionosphere correction,
$s_i(t)$ the position of the satellite $SV_i$ at the time t,
frac fraction operator determined preferably as follows:
   frac r=r−round r,
c speed of light.

In the function of formula (2) the fraction operation is thus directed to the difference obtained as the difference between the estimated propagation time from the satellite to the receiver and the fraction of the real propagation time measurement of the signal. The real propagation time cannot be measured at this phase, but only the C/A code phase, which is only a part (a fraction) of the whole pseudo distance. The entire part, i.e. the number of the code phases, is unknown and it is estimated from the propagation time of the signal. Nevertheless, this fraction is known to a sufficient degree before the position is determined. By optimizing the cost function, an attempt is made to find such a position, in which the reference number formed is as small as possible. The reference number is e.g. the sum of the residual errors, as presented in formula (2), or the product. The fraction operation is preferably such, that the entire part is removed from the argument of the fraction operation, wherein a fraction remains.

In accordance with the ephemeris data of the satellites it is possible to detect the position of the satellite $SV_i$ that transmitted the signal at the moment the signal is transmitted. However, the time data of the positioning receiver PR is not necessarily exactly correct, wherein the position is not necessarily exactly correct at first when solving the formula (2). Therefore, a clock error β of the positioning receiver is included in the cost function, which clock error can be set sufficiently close to the correct value when the minimum value is searched for. The code phase $\phi_i$ of the satellite $SV_i$ can be determined by measuring from the signal received by the receiver. However, errors can be involved in the measurement of the code phase, which errors can be caused e.g. by the influence of the atmosphere to the propagation of the satellite signal. The influence of these measuring errors is estimated by the variable $\varepsilon_i$. The estimated propagation time of the signal from the satellite $SV_i$ to the receiver is usually about 0.078 s.

Figure 1:
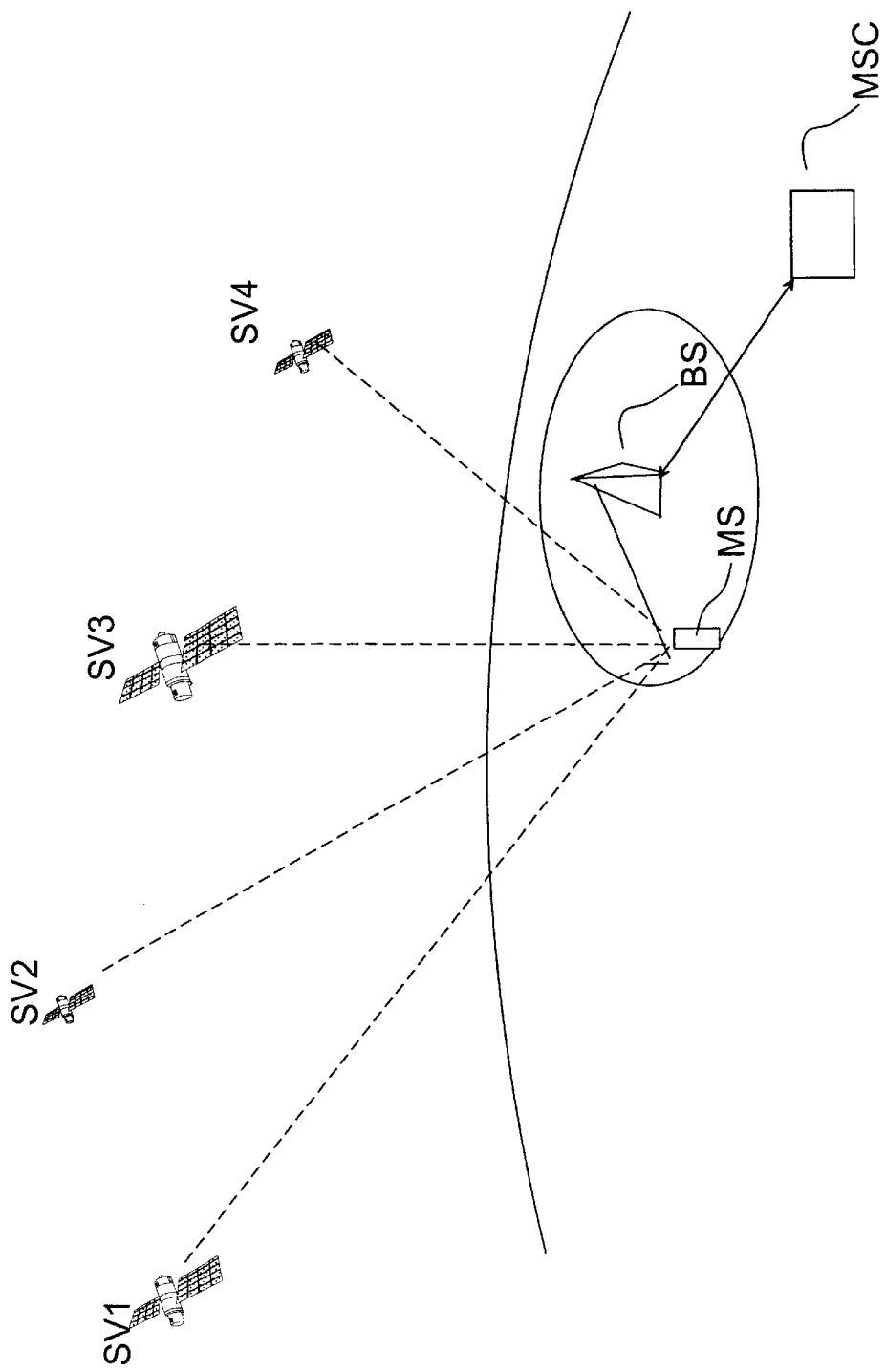
FIG. 1 shows, in a reduced principle chart, positioning by means of a signal transmitted from four satellites.

In the method according to a first preferred embodiment of the invention, the positioning is carried out in the following way. At the initializing stage default values are set for the time and the location of the receiver. The default position selected as the position x of the receiver can be e.g. the position of the servicing base station BS (FIG. 1). The used default value of time can be the clock time, which at this stage, however, can still be erroneous to a significant degree. Additionally, it is searched whether sufficient amount of ephemeris data is available in the receiver PR. In case the receiver has not a sufficient amount of ephemeris data on all those satellites whose signals are used in the positioning of the receiver, attempt is made to provide the missing ephemeris data to the receiver, e.g. from a mobile communication network. In addition, information on the properties of the ionosphere can be provided to the receiver in order to determine the ionosphere corrections possibly needed when calculating the formula (2). The ionosphere can have some effect on the propagation of the signals, wherein by considering the influence of the ionosphere, the precision of the positioning can be further improved to some extent. After all the necessary information has been determined at the initializing stage, acquisition to the necessary satellite signals can be started. E.g. based on the orbit information and the time estimation, it is possible to determine in the receiver PR which satellites are at a given moment positioned in such a place that their signal can be received in the receiver PR. Also, in case there are more than 5 such satellites, those satellites (GDOP, Geometric Dilution of Precision) can be selected that are located at the most preferable position in view of positioning, which is known as such. After the receiver PR is locked to necessary satellite signals, the code phase measurements (C/A) can be started. On the other hand, it is possible that locking to satellites and code phase measurements are started already at the initializing stage, before all the necessary information is available. The code phase measuring results $\phi_i$ are cut to milliseconds, in a manner that $$\phi_i \in \left( -\frac{1}{2}, \frac{1}{2} \right).$$

The next step is to minimize the cost function (2). In the method according to a first preferred embodiment of the invention, the minimization of cost function is carried out in a manner that formula (2) is calculated, wherein a value for the cost function is obtained. The calculation is repeated by means of an optimizing method known as such, by which attempt is made in finding the local minimum of the cost function. The cost function has one global minimum, in case the time estimation and the default position used as the initial values are close enough to the correct location. In practice it can be difficult to find out whether the time estimation and the default location are sufficiently close to the correct ones. The following inequality can be used as one estimation.

$$\frac{1}{210 \text{ s}} |\Delta t| + \frac{1}{150 \text{ km}} \|\Delta x\| + 2|\Delta \beta| + 2|\Delta \varepsilon| < 1 \quad (3)$$

Because the cost function is clearly convex, the optimization converges very fast. Thus, the gradient of the cost function and the Hesse matrix are relatively easy to estimate, particularly if the satellite orbits are approximated by polynomials. Thus, advantageous optimizing methods include the Gauss-Newton method and the conjugated gradient method.

The optimization can be carried out even using the following kind of iteration.

$$\begin{bmatrix} t_{k+1} \\ x_{k+1} \\ \beta_{k+1} \end{bmatrix} = \begin{bmatrix} t_k \\ x_k \\ \beta_k \end{bmatrix} - H^{-1} \nabla f \quad (4)$$

in which $$\nabla f \approx \frac{2000}{c} \sum_{i=1}^{n} frac\left(\phi_i + \varepsilon_i + \beta - \frac{1000}{c} \|s_i(t-\tau_i) - x\|\right) \begin{bmatrix} -v_i^T u_i \\ u_i \\ \frac{c}{1000} \end{bmatrix} \in R^5$$

$$H \approx \sum_{i=1}^{n} \begin{bmatrix} -v_i^T u_i \\ u_i \\ \frac{c}{1000} \end{bmatrix} \begin{bmatrix} -v_i^T u_i & u_i & \frac{c}{1000} \end{bmatrix} \in R^{5 \times 5}$$

in which $u_i$ is the unit vector from the receiver PR to the satellite $SV_i$ and $v_i = s_i'(t-\tau_i)$.

The positioning can be accelerated to some extent by carrying out the above-described optimizing phase in the following manner. The orbit functions of the satellites $s_i(t)$, i=1 . . . n, are set using e.g. a third level interpolating polynomials and calculating pseudo range corrections $\epsilon_i$ using the position of the receiver PR as the default position. The minimum of the cost function is searched for keeping the values of the pseudo range correction $\epsilon_i$ constant. If the location according to the minimum point is far from the default location, the afore-mentioned setting phase of the orbit functions of the satellites and the search phase of the minimum function are repeated, in which phases the location obtained in the previous calculation is used as the new default location of the receiver.

When the minimum point has been determined in the optimizing phase, the location x of the receiver, the time t and the clock error β of the receiver are known.

The solution relates to a 5-dimension equation group (time, place, clock error), and therefore when this method according to the first preferable embodiment of the invention is applied, signals of at least five satellites are received and their code phases are measured in the receiver PR. In addition, at least the ephemeris data of these five satellites has to be communicated to the receiver PR in order to perform minimization. However, since the ephemeris data is valid for a relatively long period of time, typically for several hours (4 to 6 hours), there is no need to communicate this ephemeris data very often. In good signal conditions it is also possible that a receiver can display the ephemeris data from the signals received, wherein it is not necessary to send ephemeris data to the receiver separately.

Positioning can be substantially performed immediately after the acquisition of the receiver PR has been carried out to the signals of at least five satellites and the receiver PR has performed code phase measurements on the basis of these signals. In this preferred embodiment it is sufficient, in view of the precision of the default values of the position and the time data of the receiver, that the location is known with precision of about 150 km, and the time error is ±210 s, at the most. In case signals of more than five satellites are received in the receiver, these extra satellite signals can be used for determining such local minimum points that are erroneous. Such an erroneous local minimum point can be formed in the minimization of a cost function, in case the default location of the receiver is further away than said 150 km, and/or if the clock error is more than said ±210 s. However, the value of such an erroneous local minimum value is higher than the minimum point of the cost function corresponding to the correct position.

In accordance with a second preferred embodiment of the invention it is not necessary to know the default position and time data of the receiver PR in advance. The positioning is thus carried out using the cost function (2) in the following advantageous manner. The position of the receiver is detected by dividing the geographical area searched (country, continent, earth) and time data into smaller four-dimensional sub-sections of the approximate size of 300 km×300 km×300 km×420 s. A local minimum point of cost function (2) is searched for each such area searched. After the minimum point of the cost function has been detected from at least two of such areas, these local minimum points are compared. If one of these local minimum points is clearly smaller than the other local minimum points, it can be assumed that the smallest local minimum point in question corresponds to the correct location and time data of the receiver PR. In this case the search can be terminated. If no such minimum point that is distinctly smaller than the others is found, the search is continued in various sub-areas until a clearly smaller minimum point is found, or until all the sub-areas of the area to be searched have been examined. Thus, the smallest local minimum point indicates the location and the time data (clock error) of the receiver PR. In this method according to the second preferred embodiment of the invention there is therefore no need for the default location or time data of the receiver, but the positioning can be carried out based on the code phase measurements and the orbit data.

In the method according to a third preferred embodiment of the invention, positioning is carried out advantageously in a manner that the local minimum point is searched in the optimizing phase, whereafter positioning data corresponding to the minimum point is changed from the earth centered, earth fixed (ECEF) coordinates to geodetic latitude-longitude-height coordinates. Among these coordinates the height data is searched and if it is too high or too low, it can be deduced that the determined location is not correct. After this, the new optimization of a cost function is carried out. In the new optimization it is thus possible to use another time estimation and/or default location. The allowed limits set for the height data can e.g. −500 m (below the sea/ground level) and +10 km. The height data outside these limits normally indicates that the position is too low or too high relative to the earth surface. Due to (orbit) geometry of satellites, the height at an erroneous minimum point is typically 300 km or 600 km too high or too low relative to the earth surface.

The functions of the method according to the invention can be largely implemented as programs in a control unit 9, advantageously as program codes of a digital signal-processing unit DSP. The cost function is preferably stored into a memory 11 and/or to the program code of the control unit 9.

A reference clock is formed for example using a real-time clock (RTC) in the receiver MS, or it may also be formed by an external clock (not shown), or the time data may be obtained from an external network, such as a mobile communication network.

The mobile communication means MT preferably comprise a second antenna 12, a radio part 13, audio means, such as a codec 14*a*, a speaker 14*b* and a microphone 14*c*, a display 15 and a keyboard 16, and a memory 11. The control block 9 can be at least partly common to perform the functions of the receiver PR and to perform the functions of the mobile communication means MT, or separate processors or the like can be used for these functions.

It is obvious that the present invention is not limited solely to the above-presented embodiments, but it can be modified within the scope of the appended claims.

What is claimed is:

1. A method for performing positioning, comprising the steps of receiving a spread spectrum signal modulated with a repetition code and transmitted by satellites, performing an acquisition to the received spread spectrum modulated signal, measuring the code phase of the received spread spectrum modulated signal, receiving ephemeris parameters of satellites which are used in the positioning, determining a cost function, and performing an optimizing phase for minimizing the cost function, wherein the cost function includes a fraction operator having an argument that includes at least one residual error.

2. The method as set forth in claim 1, wherein the residual error is formed of the difference between the estimated propagation time from satellite to receiver and the fraction of the real propagation time measurement of the signal, and in which the code phase measured from the received signal is used as the fraction of the time of flight measurement.

3. The method as set forth in claim 1, wherein the sum of two or multiple residual errors is used as the argument of the fraction operator.

4. The method as set forth in claim 1, wherein as said cost function is the function:

$$f(t, x, \beta) = c \sum \left[ frac\left(\phi_i + \varepsilon_i(t, x) + \beta - \frac{1000}{c} \|s_i(t - \tau_i) - x\| \right) \right]^2,$$

in which $$\tau_i = \frac{1}{c} \|s_i(t - \tau_i) - x\|,$$

the estimated propagation time of the signal from a satellite $SV_i$ to a positioning receiver, t time,
the position of the positioning receiver,
β the clock error of the positioning receiver in milliseconds,
$\phi_i$ the code phase of the signal of the satellite $SV_i$ in the positioning receiver,
$\varepsilon_i$ estimated compensation of a measuring error (pseudo range correction) comprising group delay, time correction of satellites, and ionosphere correction,
$s_i(t)$ the position of the satellite $SV_i$ at the time t,
frac fraction operator,
c speed of light.

5. The method as set forth in claim 4, wherein said fraction operator is determined as follows: frac r=r−round r.

6. The method as set forth in claim 1, wherein said residual error is formed at least on the basis of said code phase measurement and ephemeris parameters.

7. The method as set forth in claim 1, wherein in order to perform the optimizing phase a default value is selected for the time error and the location of the receiver.

8. The method according to claim 1, wherein signals transmitted by at least five satellites are used in the positioning.

9. The method as set forth in claim 1, wherein at least two local minimum points are searched, and the location of the receiver is determined on the basis of the smallest local minimum point determined in said optimizing phase.

10. The method as set forth in claim 1, wherein after the optimizing phase the height data of the location corresponding to minimum point of the cost function is compared to the predetermined minimum value and maximum value, wherein, in case the height data is smaller than said minimum value or higher than said maximum value, a new optimizing phase is carried out, in other cases the location of the receiver is determined on the basis of a local minimum point determined in said optimizing phase.

11. The method as set forth in claim 1, wherein the minimization of the cost function is repeated with the formula $$\begin{bmatrix} t_{k+1} \\ x_{k+1} \\ \beta_{k+1} \end{bmatrix} = \begin{bmatrix} t_k \\ x_k \\ \beta_k \end{bmatrix} - H^{-1} \nabla f,$$

in which $$\nabla f \approx \frac{2000}{c} \sum_{i=1}^{n} frac\left(\phi_i + \varepsilon_i + \beta - \frac{1000}{c} \|s_i(t - \tau_i) - x\| \right) \begin{bmatrix} -v_i^T u_i \\ u_i \\ \frac{c}{1000} \end{bmatrix} \in R^5$$

$$H \approx \sum_{i=1}^{n} \begin{bmatrix} -v_i^T u_i \\ u_i \\ \frac{c}{1000} \end{bmatrix} \begin{bmatrix} -v_i^T u_i & u_i & \frac{c}{1000} \end{bmatrix} \in R^{5 \times 5}$$

in which $u_i$ is the unit vector from the receiver PR to the satellite $SV_i$ and $v_i = s_i'(t - \tau_i)$.

12. An electronic device comprising means for performing positioning, comprising means for receiving a spread spectrum signal modulated with a repetition code and transmitted by satellites; means for performing acquisition to the received spread spectrum modulated signal; means for measuring the code phase of the received spread spectrum modulated signal; means for receiving the ephemeris parameters of satellites to be used in the positioning, means for determining a cost function, and means for minimizing the cost function, wherein the cost function includes a fraction operator having an argument that includes at least one residual error.

13. The electronic device as set forth in claim 12, wherein the residual error is formed of the difference between the estimated time of flight from the satellite to the receiver and the fraction of the real time of flight measurement for the signal, and in which the code phase measured from the received signal is used as the fraction of the time of flight measurement.

14. The electronic device as set forth in claim 12, wherein the sum of two or multiple residual errors is used as the argument of the fraction operator.

15. The electronic device as set forth in claim 12, wherein the cost function used is the function:

$$f(t, x, \beta) = c \sum \left[ frac\left(\phi_i + \varepsilon_i(t, x) + \beta - \frac{1000}{c} \|s_i(t - \tau_i) - x\| \right) \right]^2,$$

in which $$\tau_i = \frac{1}{c}\|s_i(t-\tau_i) - x\|,$$

the estimated propagation time of the signal from a satellite i to the positioning receiver, t time,
x the position of the positioning receiver,
β the clock error of the positioning device in milliseconds,
$\phi_i$ code phase of the satellite i,
$\epsilon_i$ estimated compensation of a measuring error (pseudo range correction) comprising group delay, time correction of satellites, and ionosphere correction,
$s_i(t)$ the position of the satellite i at the moment of time t,
frac fraction operator,
c speed of light.

16. The electronic device as set forth in claim 15, wherein said fraction operator is determined as follows: frac r=r−round r.

17. The electronic device as set forth in claim 12, wherein said residual error sum is formed at least on the basis of said code phase measurement and ephemeris parameters.

18. The electronic device as set forth in claim 12, wherein a default value is selected for its time error and the position of the receiver.

19. The electronic device as set forth in claim 12, wherein the means for receiving a signal transmitted by the satellites and spread spectrum modulated by the repetition code comprise means for receiving signals sent by at least five satellites.

20. The electronic device as set forth in claim 12, comprising means for detecting at least two local minimum points of the cost function, and means for determining the position of the receiver on the basis of the smallest local minimum point.

21. The electronic device as set forth in claim 12, comprising means for comparing the height data of a position corresponding to the minimum point of the cost function to a predetermined minimum value and maximum value, wherein a new optimizing phase has been arranged to be performed, in case the height data is smaller than said minimum value or higher than said maximum value, and that the position of the receiver has been arranged to be determined on the basis of the local minimum point, in case the height data is higher than or equal to said minimum value and smaller than or equal to said maximum value.

* * * * *

UNITED STATES PATENT AND TRADEMARK OFFICE
CERTIFICATE OF CORRECTION

PATENT NO. : 6,784,834 B2
DATED : August 31, 2004
INVENTOR(S) : Sirola et al.

It is certified that error appears in the above-identified patent and that said Letters Patent is hereby corrected as shown below:

<u>Column 9,</u>
Line 30, please delete the word "as".
Line 47, please insert -- x -- before the word "the".

Signed and Sealed this

Ninth Day of November, 2004

JON W. DUDAS
*Director of the United States Patent and Trademark Office*